UNITED STATES PATENT OFFICE.

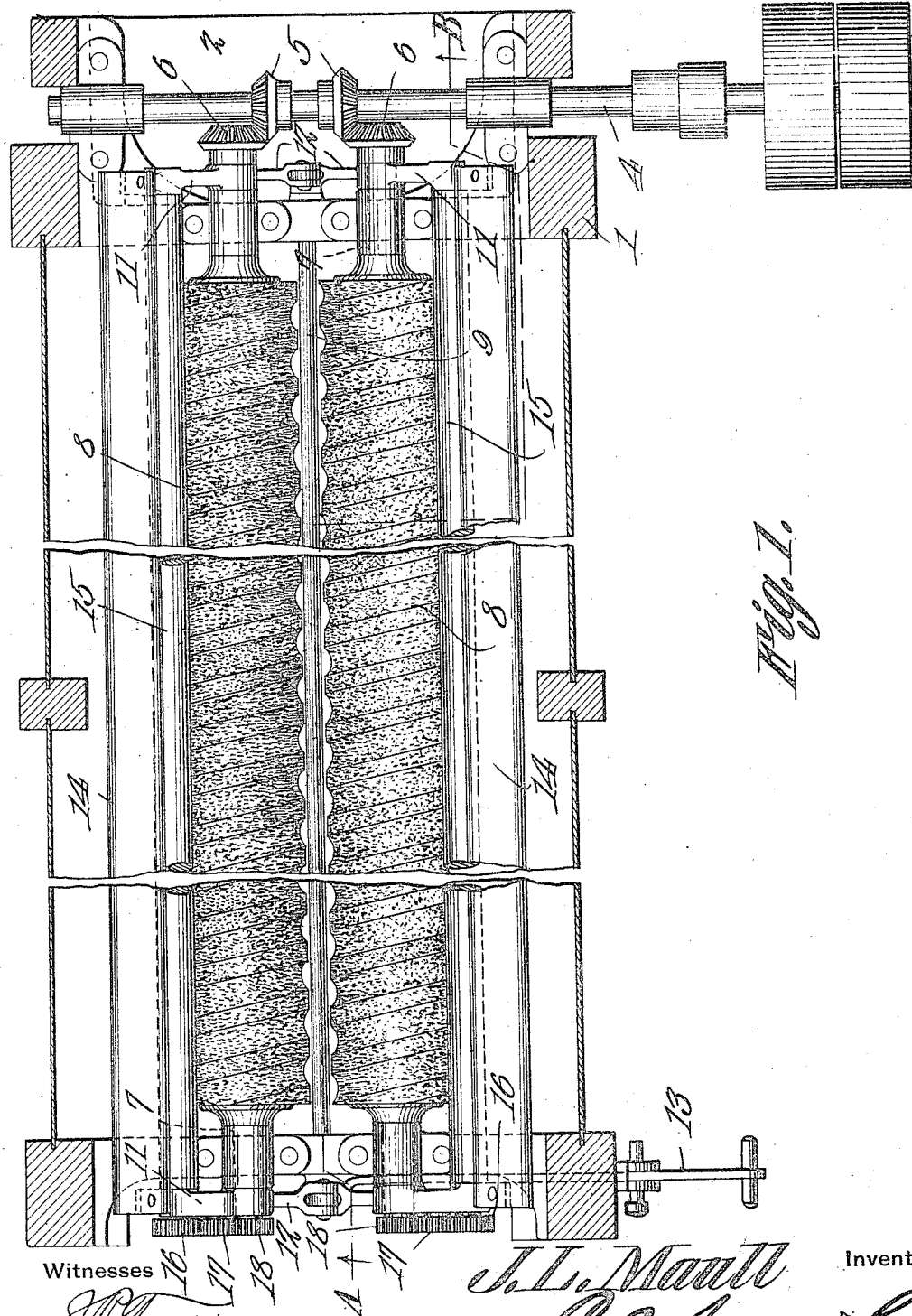

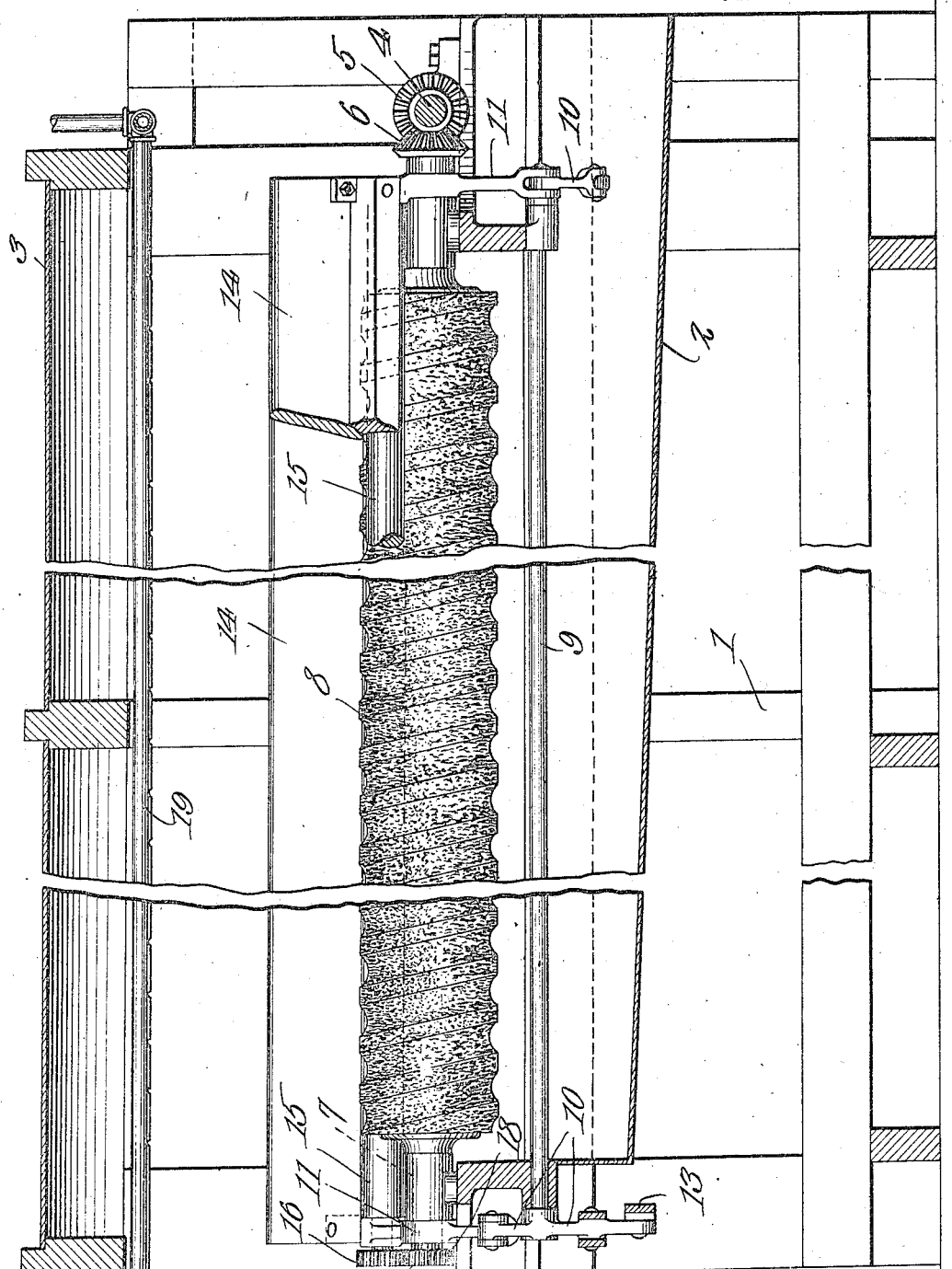

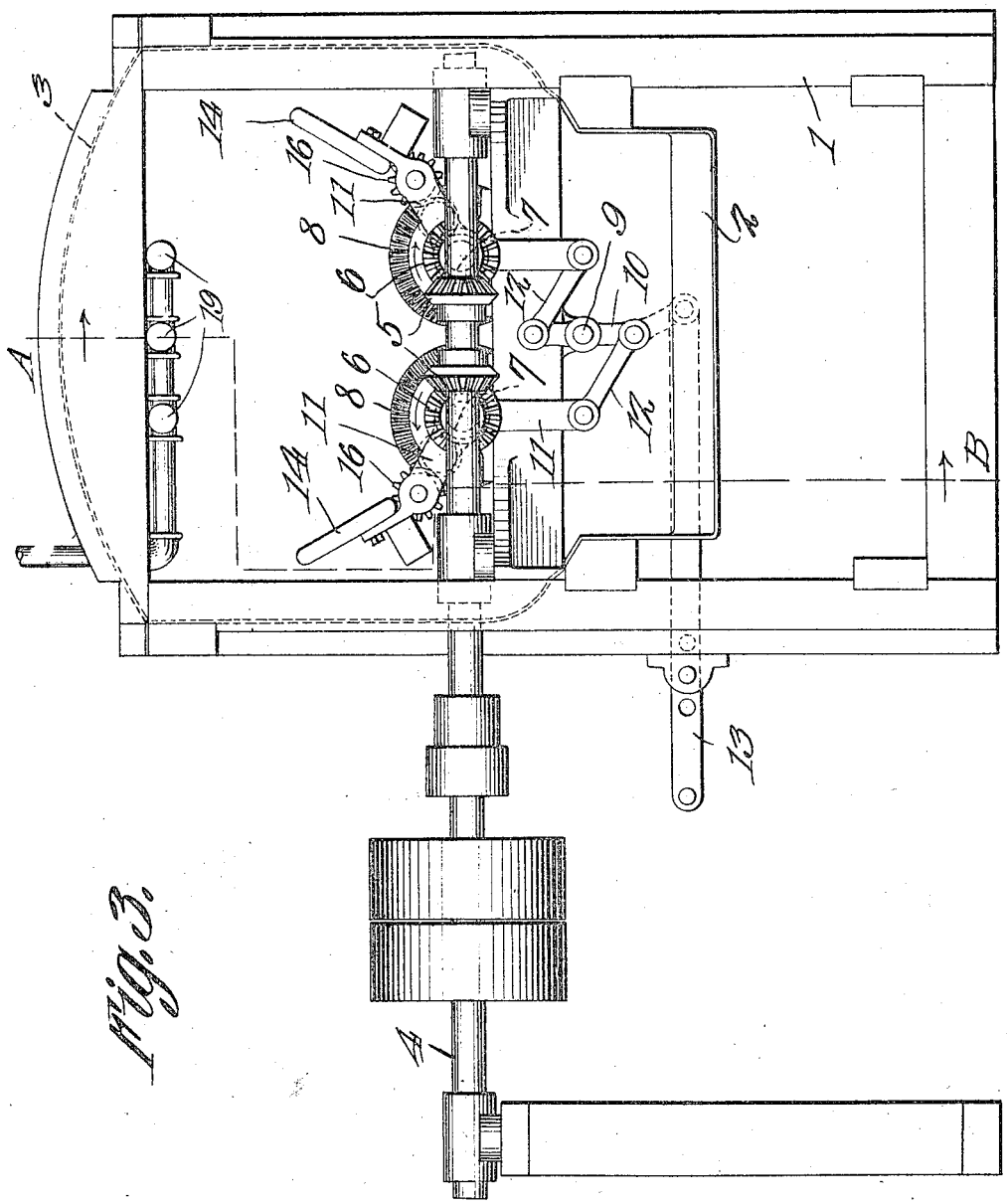

JAMES L. MAULL, OF CRESCENT CITY, FLORIDA.

MACHINE FOR WASHING FRUIT.

1,124,487.  Specification of Letters Patent.  Patented Jan. 12, 1915.

Application filed October 16, 1914. Serial No. 866,977.

*To all whom it may concern:*

Be it known that I, JAMES L. MAULL, a citizen of the United States, residing at Crescent City, in the county of Putnam and State of Florida, have invented a new and useful Machine for Washing Fruit, of which the following is a specification.

This invention relates to machines for washing fruit, one of its objects being to provide coöperating elements whereby the fruit supplied to the machine will be conveyed longitudinally through the machine by one of the elements and the fruit, during such movement, will be rotated so that all parts of the fruit will be brought into contact with the washing elements.

A further object is to provide means whereby the machine can be adjusted readily for use in connection with fruit of different sizes.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a plan view of the washing mechanism, the frame and hood of the machine being shown in section. Fig. 2 is a section on line A—B Fig. 1. Fig. 3 is an end elevation.

Referring to the figures by characters of reference 1 designates a frame having a trough 2 supported therein, there being a hood 3 extending from the sides of the trough adapted to house the mechanism of the machine. This hood is made of removable sides and top.

Journaled within one end portion of the frame is a transverse drive shaft 4 adapted to be driven in any suitable manner, this shaft being preferably extended laterally beyond the frame as shown particularly in Fig. 3. Secured to the shaft 4 are oppositely disposed beveled gears 5, each of which meshes with a bevel gear 6 secured to one end of a longitudinal shaft 7 journaled within the frame 1 and above the trough 2. The two shafts 7 are parallel and mounted on each of these shafts is a spiral brush 8 designed, when the shaft is rotated in the direction indicated by the arrow in Fig. 3, to feed the engaged fruit longitudinally of the machine.

Extending longitudinally under the space between the two brushes 8 is a shaft 9 having oppositely extending arms 10 secured to each end thereof. Pivotally mounted on each shaft 7 near each end is a lever 11 the lower arm of which is connected to one of the adjacent arms 10 by means of a link 12. As the two arms 11 at each end of the machine are connected to the respective arms 10, it will be apparent that when shaft 9 is rotated, the levers fulcrumed on the shafts 7 will be swung in opposite directions, thus to cause the upper arms of said levers to swing toward or from each other. For the purpose of actuating the shaft 9 and thereby shift levers 11 relative to each other, an actuating bar 13 is pivotally connected to one of the arms 10 and extends laterally from the machine, any suitable means being provided for holding this bar against movement after it has been adjusted.

The upper arms of levers 11 diverge normally and the terminal portions of these arms are secured to and support side boards 14 which extend longitudinally of the machine. Journaled between the upper arms of the levers 11 are smooth face rollers 15 parallel with the shafts 7 and supported close to the adjacent brushes 8. Each of these rollers 15 has a gear 16 at one end thereof, said gear meshing with an intermediate gear 17 journaled upon the upper arm of the lever 11. This intermediate gear meshes with a gear 18 secured to the adjacent shaft 7. Consequently it will be seen that, when shaft 7 is rotated, the brush 8 will not only move therewith, but motion will be transmitted through the gears to the adjacent roller 15 which will be driven in the same direction as the brush.

As before pointed out, during the rotation of the shaft 4, the brushes 8 are simultaneously rotated in opposite directions respectively or, in other words, serve to convey toward the rollers 15, any fruit which may be placed upon the brushes. The rollers 15 likewise rotate in the same direction as the brushes adjacent thereto.

When fruit is deposited on one of the brushes 8 it will be carried thereby against the adjacent roller 15 and will, by reason of the spiral surface of the brush, be conveyed longitudinally along the brush and the roller 15. During this longitudinal movement of the fruit it is subjected to the action of the roller 15 with which it contacts so that the fruit is not only conveyed longitudinally by the brush but is also given an individual rotation which, combined with the longitudinal movement to which the fruit is subjected, results in imparting to the fruit a gyratory motion whereby all portions of the surface of each fruit are caused to come into contact with the brush. Consequently thorough washing of the fruit is insured. By having the rollers 15 adjustably mounted relative to the brushes 8, the machine can be adjusted for use in connection with fruit of different sizes. Where larger fruits are used, the rollers 15 are adjusted downwardly whereas, where smaller fruits are employed the said rollers are adjusted upwardly, the object being at all times to maintain the center of gravity of the fruit a short distance to one side of the vertical center of the brush 8 so that the fruit is kept in contact with the roller 15 almost entirely by the pressure of the brush thereagainst.

In order that water may be supplied to the fruit while being acted on by the brushes, sprinkling pipes 19 are supported above the brushes as shown and are connected with a suitable supply whereby water will be discharged downwardly onto the fruit.

By providing a hood made up of removable sides and a removable top, access can be had readily to the interior of the machine for repairing and cleaning it.

A machine such as herein described has been found very efficient for the purpose of washing fruit and is especially advantageous by reason of its simple and durable construction as well as its efficiency in cleaning all portions of the surface of a fruit.

One important advantage resulting from the fact that the rollers 15 rotate in the same direction as the brushes 8 is that the said rollers thus prevent the fruit from being drawn into the path between the brush and the roller. Each roller exerts an upward outward pressure against the fruit which not only serves to rotate the fruit, but also to lift it away from the pass between the roller and the brush.

What is claimed is:—

1. A machine for washing fruit, including a revoluble combined brush and spiral conveyer, a smooth faced roller parallel with the brush, and means for rotating the brush and roller simultaneously in the same direction.

2. A machine for washing fruit, including a revoluble combined brush and spiral conveyer, a smooth faced roller parallel with the brush, and means for rotating the brush and roller simultaneously in the same direction, said roller being adjustable angularly about the axis of the brush.

3. A machine for washing fruit, including a revoluble combined brush and spiral conveyer, a smooth faced roller parallel with the brush, means for rotating the brush and roller simultaneously in the same direction, said roller being adjustable angularly about the axis of the brush, and a side board parallel and adjustable with the roller.

4. A fruit washing machine including a shaft, a spiral brush revoluble therewith, levers pivotally mounted on the shaft, a smooth faced roller journaled in the levers and close to and parallel with the brush, means for adjusting the levers angularly to shift the roller relative to the brush, means for rotating the brush, and means for transmitting motion to the roller irrespective of the angular adjustment of the lever, said roller and brush being revoluble simultaneously in the same direction.

5. In a fruit washing machine, the combination with parallel shafts, and oppositely revoluble spiral brushes upon the respective shafts, of levers fulcrumed upon each shaft, rollers journaled within the levers and parallel with and close to the respective brushes, said rollers having smooth faces, means for rotating each roller in the same direction as the adjacent brush, and means for simultaneously shifting the levers to adjust the rollers toward or from each other and relative to the brushes.

6. A machine for washing fruit, including a revoluble combined brush and spiral conveyer, a smooth-faced roller parallel with the brush, means for rotating the brush and roller simultaneously in the same direction, and water discharging means supported above and parallel with the brush.

In testimony that I claim the foregoing as my own, I have hereto affixed my signature in the presence of two witnesses.

JAMES L. MAULL.

Witnesses:
F. M. DURRANCE,
ROBT. R. BARRINGER.